(12) United States Patent
Guerrina

(10) Patent No.: US 7,026,568 B2
(45) Date of Patent: Apr. 11, 2006

(54) CERAMIC WELD INSULATOR AND METAL WELD GEAR COMBINATION FOR AN IMPROVED MICRO WELD HEAD COMPONENT OF AN ORBITAL TUBE WELDING APPARATUS

(76) Inventor: Michael Guerrina, 1503 Spring Garden Rd., Austin, TX (US) 78746

( * ) Notice: Subject to any disclaimer, the term of this patent is extended or adjusted under 35 U.S.C. 154(b) by 0 days.

(21) Appl. No.: 10/211,932

(22) Filed: Aug. 2, 2002

(65) Prior Publication Data

US 2003/0111444 A1 Jun. 19, 2003

Related U.S. Application Data

(63) Continuation-in-part of application No. 09/620,506, filed on Jul. 20, 2000, now Pat. No. 6,459,062.

(51) Int. Cl.
*B23K 9/12* (2006.01)

(52) U.S. Cl. .................. 219/60 A; 219/125.11

(58) Field of Classification Search ............... 219/60 A, 219/125.11
See application file for complete search history.

(56) References Cited

U.S. PATENT DOCUMENTS 3,194,936 A * 7/1965 Roderick et al. ......... 219/60 A
5,844,190 A * 12/1998 Benway et al. ........... 219/60 A

* cited by examiner

Primary Examiner—Clifford C. Shaw
(74) Attorney, Agent, or Firm—David Henry

(57) ABSTRACT

The invention is of an improvement to orbital welding heads and welding systems for welding pipe and tubing butt joints, consisting of a novel combination of materials, including a ceramic weld insulator and a metal weld gear. Such a combination, which has a greater dielectric strength than a plastic housing design, results in a more concentric tungsten travel path, increases the duty cycles of the weld head, minimizes erratic and wandering arcing, creates an electrical insulation yielding minimal expansion, allows for increased clamping surface for improved tube alignment, and provides a compact and very robust weld head.

4 Claims, 2 Drawing Sheets

CERAMIC WELD INSULATOR AND METAL WELD GEAR COMBINATION FOR AN IMPROVED MICRO WELD HEAD COMPONENT OF AN ORBITAL TUBE WELDING APPARATUS

CITATION TO PARENT APPLICATION

This is a continuation-in-part of Ser. No. 09/620,506, filed Jul. 20, 200, now U.S. Pat. No. 6,459,062 which issued Nov. 10, 2002, from which priority is claimed pursuant to 35 U.S.C. 120.

BACKGROUND OF THE INVENTION

1. Field of the Invention

The present invention provides a new and improved ceramic insulator and metal weld gear for an improved micro weld head component of an orbital tube welding apparatus.

2. Background Information

Orbital tube welding was first used in the 1960s when the aerospace industry needed a superior joining technique for aircraft hydraulic and fuel system lines. This automated process was accomplished when the arc from a tungsten electrode was rotated accurately around the tubing weld joint. Two decades later orbital tube welding gained application in many other industries due to the development of smaller, more portable, solid-state power supplies, advanced control systems and other advancements. Advancements in orbital welding can now yield controlled, consistently high-quality and well-documented welds cost-effectively.

An orbital welding system consists of a solid-state power supply (operating from 110 VAC) and a rotor and electrode housed in the orbital weld head. The power supply and microprocessor technology system supplies and controls the system's output characteristics, i.e., welding parameters, like the arc welding current, the power to drive the motor in the weld head, and the switching on and off of the shield gas, are programmed.

In automatic orbital welding systems, tubes or pipes are clamped in place. This orbital welding process uses the Gas Tungsten Arc Welding (GTAW; also referred to as TIG welding) process as the source of the electric arc that melts the base material and forms the weld. (The heat found at the tungsten tip can be between approx. 2400 to 2800 degrees F.) The electric arc is established between the non-consumable tungsten electrode (typically two percent thoriated Tungsten or two percent ceriated Tungsten) and the part to be welded, called the weld puddle. To initiate the electric arc, an RF or high-voltage signal ionizes the shielding gas (usually argon) to start a path for the weld current. A capacitor delivers current into the arc to reduce arc voltage to a point where the power supply can regulate. Failure to establish the proper arc gap can compromise weld quality and penetration. The power supply provides the weld current to keep the arc established. The metal or stainless steel tube or pipe to be welded is melted by the intense heat of the arc and fuses together.

The orbital weld head rotates the tungsten electrode and the electric arc around the weld point to join the adjoining surfaces. Orbital weld heads are usually of the enclosed type with an inert atmosphere chamber that surrounds the weld joint. An inert shielding gas, most commonly argon, is fed through the weld head (or torch). Shield gas is required during welding to protect the electrode, molten weld puddle and solidifying weld metal from atmospheric contamination.

Orbital welding equipment is now used by many industries, from non-critical to high purity applications, including semiconduction and pharmaceutical applications. Automated orbital welding equipment can drastically outperform manual welders qualitatively and quantitatively and consistently yield a much higher quality of weld without the normal variability, inconsistencies, errors or defects of manual welding. Also, orbital welding may be used where a tube or pipe to be welded cannot be rotated or readily rotated, or where space restrictions limit the physical size of the orbital welding equipment.

Due to the increasing demand for quality welds it's important to precisely control the travel speed and concentricity of the tungsten tip with the tubes being welded. The moving parts are subjected to intense heat that causes the parts to expand and the weld head needs to allow for this expansion. In the industry today the weld head is either water cooled or air cooled, which helps cool the moving parts and allows for increased duty cycle.

The typical duty cycle is 1 weld every 3–4 minutes. The current weld heads use a plastic housing to insulate the ground (−) current from the positive (−) current. The welding gear is constructed of metal and insulated with plastic and the clamps are metal as well. As the weld is performed the C-shaped gear begins to heat up and expand at the points of the "C". Expansion can be as much as 0.015". This expansion causes the tungsten travel path to be oval around the tubes to be welded. The tungsten gap changes as the weld gear heats up and causes inconsistent weld thickness.

The weld gear is driven by 2 spur gears and also is supported by a plastic boss that rides on both the inside and outside diameter of the weld gear. The use of plastic as an insulator limits the duty cycle and does not expand at the same rate of the metal parts, making it difficult to closely align the mating moving parts. When the weld head is used more then the recommended duty cycle the gear expands beyond the calculated tolerance and binds between either the spur gears that drive the weld gear or the boss that support the weld gear. When this happens the gear stops moving and causes a bad weld or breaks the internal drive components.

Another common problem found with the current design is an arcing between the weld gear and the collets that hold the tubes. The inherent shapes of gears have fine points at the tip of the gear tooth design. Because the electrical current passes through the gear to the tungsten tip, the electrical current also passes through the gear tooth. As the tungsten becomes oxidized and worn from use, the electrical current finds more resistance at the tungsten tip than the gear tooth. This causes arcing from the gear to the collets, instead of arcing between tungsten to tube. When this arcing occurred, it is very destructive to the components of the weld head and fixture block as well as the tubing being welded.

In addition to erratic arcing, other problems known to be commonly associated with current orbital welding processes include arc wandering, difficult arc starting, excessive electrode consumption, and oxidized weld deposit.

Another significant problem that has plagued automatic orbital tube welding involves the plastic insulator/housing, which holds all the parts together in an orbital weld assembly. The plastic has a different thermal expansion rate than the metal welding gears. This differential translates into a sloppy fit between the gear and the plastic.

The present invention provides a new and improved ceramic insulator and metal weld gear for an orbital welding apparatus, which overcomes the above-referenced problems and others.

SUMMARY OF THE INVENTION

Arc-gap setting depends on the weld current, arc stability, and tube concentricity or ovality. The welding engineer must keep the electrode at a constant distance from the tube surface with sufficient gap to avoid stubbing-out. Also, cooling of the weld head is imperative to achieve high production rates with consistent weld head reliability and maintainability. Today's weld heads are either water-cooled or air-cooled and have a rated duty cycle of 1 weld every 3–4 minutes.

In the proposed invention, the weld gear is a thin section gear that interlocks around the ceramic and in the preferred embodiment there are thin slits that greatly reduce the expansion force on the ceramic. Likewise, the use of a ceramic weld insulator inside of an outer gear ring with expansion slits provides more control of the expansion. Thus, the weld gear design in the proposed invention allows for rapid heating and cooling, unlike any other design on the market today. All of this will enable the weld head to operate at duty cycles of 1 weld per 30 secs.

Also, in the proposed invention, because of the expansion slits found on the gear ring the expansion forces are greatly reduced and allow for tight tolerance between gear and the support boss found on the housing. This relates to a tungsten travel path to be more concentric with the tubes being welded. The expansion of the weld gear can be held within 0.003" or better throughout the weld cycle.

The proposed invention allows for a more direct electrical path to the tungsten, which minimizes the chance of arcing anywhere other than from tungsten to the tube. This combination of ceramic and weld gear package has greater dielectric strength than a plastic housing design. The cross section thickness is minimized and allows for more clamping surface for better clamping capability. An overall narrower package provides greater flexibility for the user.

In accordance with the present invention, a new and improved apparatus for automatic tube welding is provided, which includes a ceramic insulator and metal weld gear.

One advantage of the present invention is that the rotor carries the electrically conductive member within it and insulates the conductive member from other components. Since the electrically-conductive member is substantially insulated with ceramic by the rotor, undesirable arcing from the conductive member to other components is reduced.

Still further advantages of the present invention will become apparent to those of ordinary skill in the art upon reading and understanding the following detailed description of the preferred embodiments.

It is an object of the present invention to provide an improved automatic tube welding apparatus.

It is another object of the present invention to significantly increase the duty cycle of a weld head.

It is another object of the present invention to control the expansion during a duty cycle.

It is another object of the present invention to significantly reduce the expansion force on the ceramic insulator.

It is another object of the present invention to provide more concentricity in the tungsten travel path in relation to the tubes being welded.

It is another object of the present invention to provide a more direct electrical path to the tungsten tip, which minimizes erratic and wandering arcing.

It is another object of the present invention to provide an alternative to the current plastic housing design by a combination of ceramic and weld gear package.

DETAILED DESCRIPTION OF THE PREFERRED EMBODIMENT

Figure 1:
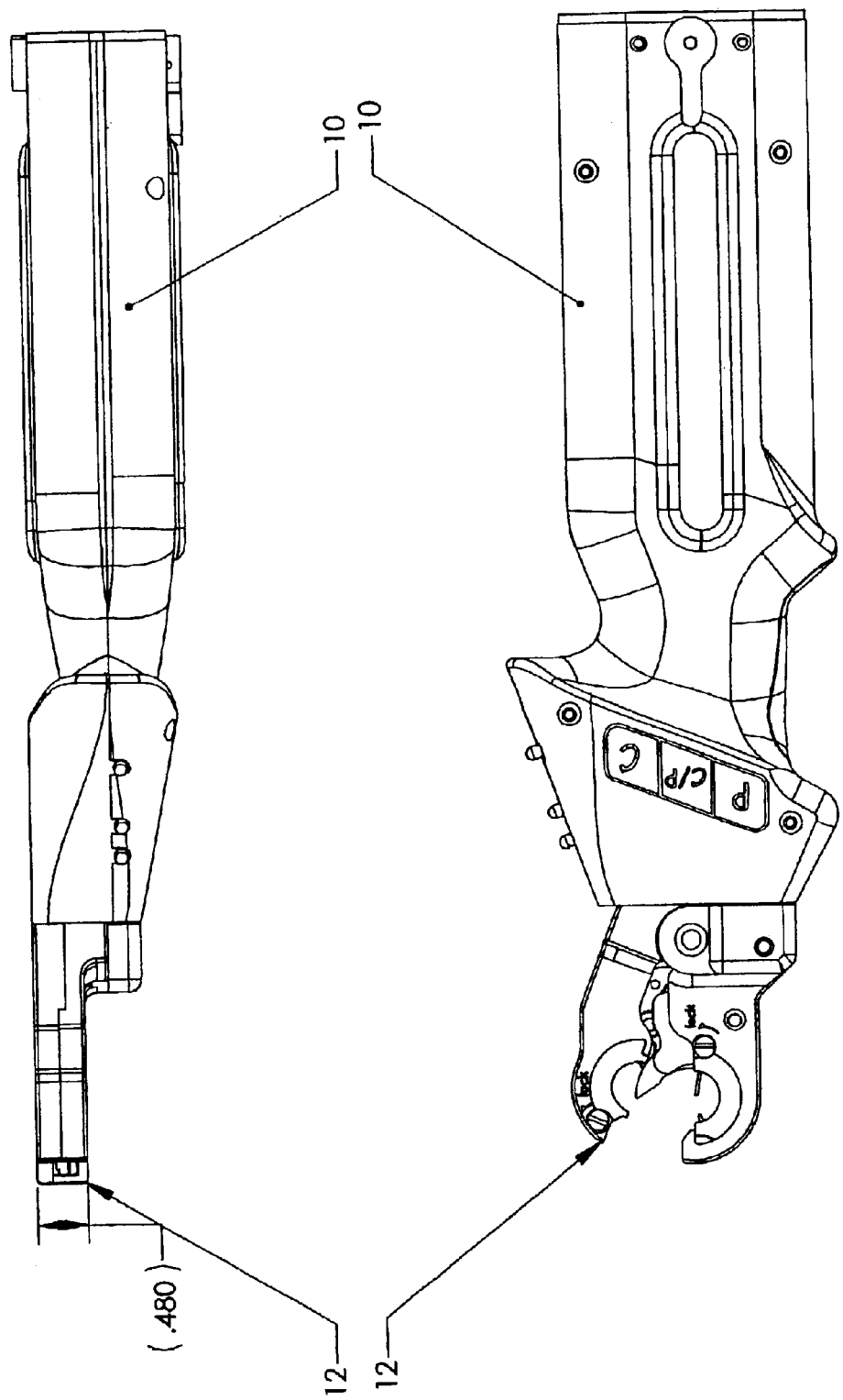
FIG. 1 shows three different perspective views of the orbital tube welding apparatus.

Referring to FIG. 1, the micro weld head apparatus 10 is shown in three different perspectives, including 2 different perspective view details of the micro weld head 12.

Figure 2:
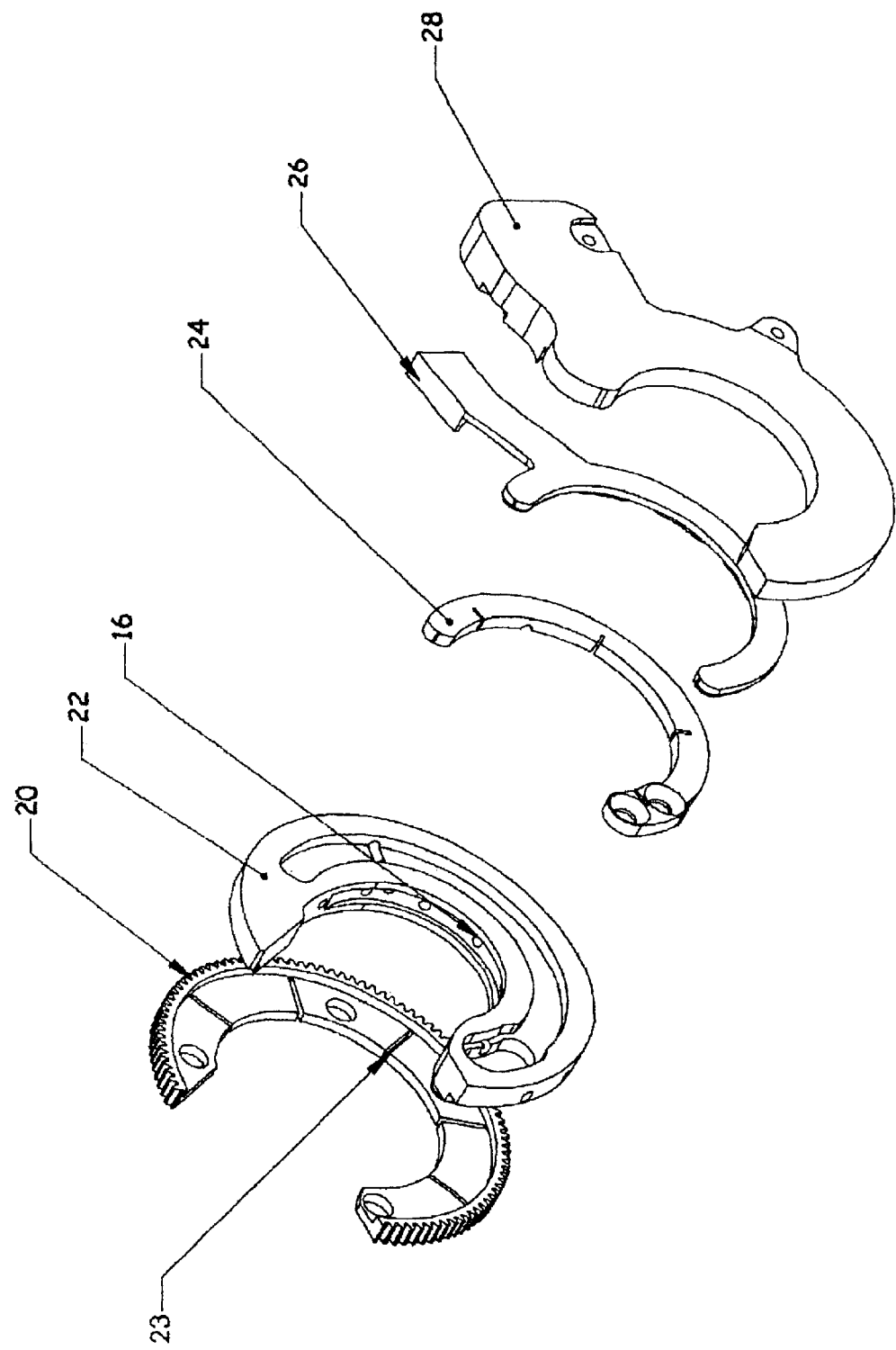
FIG. 2 shows the layout of the combination of materials for the improved micro weld head.

FIG. 2 shows the combination of materials that make up the micro weld head of the present invention. In the preferred embodiment, a weld gear assembly 16 includes a weld gear 20 in which is interlocked a ceramic insert 22.

The ceramic insert 22 provides an electrical insulation with minimal expansion (because of its ceramic construction). In the preferred embodiment, the weld gear 20, which drives the tungsten electrode (not shown) around the tubes or pipes to be welded, has slits 23, which allow for rapid heating and cooling with minimal effect to the concentricity of the path of the orbiting electrode relative to the tube, as is a serious problem with conventional weld gear assembly design.

In the preferred embodiment, the rotating electrical strip 24 is adjacent to the ceramic insert 22 but not in contact with the weld gear 20. In the preferred embodiment, the stationary electrical strip 26 is in between the rotating electrical strip 24 and the stationary electrical insulator 28.

The effect of incorporating either the ceramic insert 22 into weld gear 20, providing slits 23 in weld gear 20, and arranging the components as shown in the drawings (or all of the above) is to greatly extend the service life of the overall weld gear assembly 16, and to facilitate an optimal welding path not achievable with weld gear assemblies of conventional design. In addition, the weld gear assembly 16 allows more rapid weld cycling, because the design allows a more rapid frequency of heating and cooling, with out damaging the assembly 16 (as would occur with conventional designs). The ability to increase frequency of welding cycles (increased to once every 30 seconds, according to experimentation by the present inventor) will translate into substantial cost savings for users in an industry where every second counts (and costs).

Although not shown in the drawings, it should be understood that substantially the same benefits as provided by slits 23 as described above can be achieved by using a multi-piece gear design in lieu of that shown for gear 20. The juxtapositions between each gear sub-component would functionally correspond to slits 23 as explicitly shown herein, and would in like manner to slits 23 allow the gear to accommodate the expansion and contractions associated with welding cycles. Therefore, such an alternative design is intended to fall within the scope of the present invention as claimed.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention.

It is, therefore, contemplated that the appended claims will cover such modifications that fall within the scope of the invention.

I claim:

1. A micro weld head assembly comprising of:
   a metal weld gear having a substantially semi-circular recess formed therein:
   and
   a ceramic insulator nested within said substantially semi-circular recess.

2. The micro weld head assembly of claim 1 further comprising a rotating electrical strip juxtaposed to said ceramic insulator.

3. The micro weld head according to claim 2 wherein a stationary electrical strip is situated and flush between said rotating electrical strip and a stationary electrical insulator.

4. The micro weld head according to claim 1 wherein a plurality of slits extending from the inner margin of said weld gear to medial points between said inner margin and the outer margin of said weld gears are formed in said weld gear for accommodating expansion and contraction of said weld gear arising from the heat of welding cycles.

* * * * *